United States Patent [19]

White

[11] Patent Number: 4,789,284

[45] Date of Patent: Dec. 6, 1988

[54] SELF-CUTTING EXPANSION ANCHOR

[76] Inventor: Scott A. White, 1636 W. Main, Peoria, Ill. 61606

[21] Appl. No.: 116,954

[22] Filed: Nov. 5, 1987

[51] Int. Cl.$^4$ ............................................. F13B 13/06
[52] U.S. Cl. .................................... 411/50; 411/29; 411/55; 411/60; 411/71; 411/3; 405/259
[58] Field of Search .................. 411/31, 29, 30, 71, 411/73, 60, 57, 50, 51, 3–5, 24, 26, 55; 405/259, 260, 261

[56] References Cited

U.S. PATENT DOCUMENTS

| | | |
|---|---|---|
| 294,714 | 3/1884 | Wren . |
| 833,240 | 10/1906 | Potter . |
| 1,120,408 | 12/1914 | Rohmer et al. ................. 411/26 |
| 1,244,992 | 10/1917 | Lee . |
| 1,333,980 | 3/1920 | Stine . |
| 2,771,746 | 11/1956 | Fischer et al. . |
| 3,115,056 | 12/1963 | Teeple, Jr. . |
| 3,172,603 | 3/1965 | Bell et al. . |
| 3,247,754 | 4/1966 | Bieser ............................. 411/29 |
| 3,316,796 | 5/1967 | Young . |
| 3,851,560 | 12/1974 | Yago ............................... 411/30 |
| 3,941,028 | 3/1976 | Lobello et al. . |
| 3,960,222 | 6/1976 | Leibee et al. . |
| 3,964,229 | 6/1976 | Fischer . |
| 4,055,051 | 10/1977 | Finney . |
| 4,299,515 | 11/1981 | Yates et al. ................... 405/259 |
| 4,380,407 | 4/1983 | Donan, Jr. . |
| 4,400,122 | 8/1983 | Minaar et al. . |
| 4,518,290 | 5/1985 | Frichmann et al. ............ 411/30 |
| 4,518,292 | 5/1985 | Calanora, Jr. ................. 411/4 X |
| 4,556,344 | 12/1985 | White . |
| 4,575,294 | 3/1986 | Mermi et al. .................. 411/30 |
| 4,592,687 | 6/1986 | Piersall ........................ 411/60 X |
| 4,611,954 | 9/1986 | Cassidy ......................... 411/5 X |
| 4,673,320 | 6/1987 | Froehlich .................... 411/30 X |

Primary Examiner—Lloyd A. Gall
Assistant Examiner—Curtis B. Brueske
Attorney, Agent, or Firm—Ralph E. Walters

[57] ABSTRACT

The present invention relates to expansison anchors for solid wall installation and is specifically concerned with providing a self cutting expansion anchor which can be installed in one continuous motion by utilizing combined cutting blades and wall gripping members which cut their own undercut portion within a wall bore into which the gripping members are then permanently further expanded in positive locking engagement. Such dual-stage installation is achieved by utilizing an anchor mounting assembly having a pair or opposite-hand screw-threaded portions thereon which separately mount a blade expanding thrust member and a camming ramp on which the blades are initially expanded by axial movement of the thrust member toward the ramp and in the second stage causing the ramp to axially move toward the thrust member in further expanding relation to the blades.

6 Claims, 2 Drawing Sheets

U.S. Patent  Dec. 6, 1988  Sheet 1 of 2  4,789,284
Fig. 1
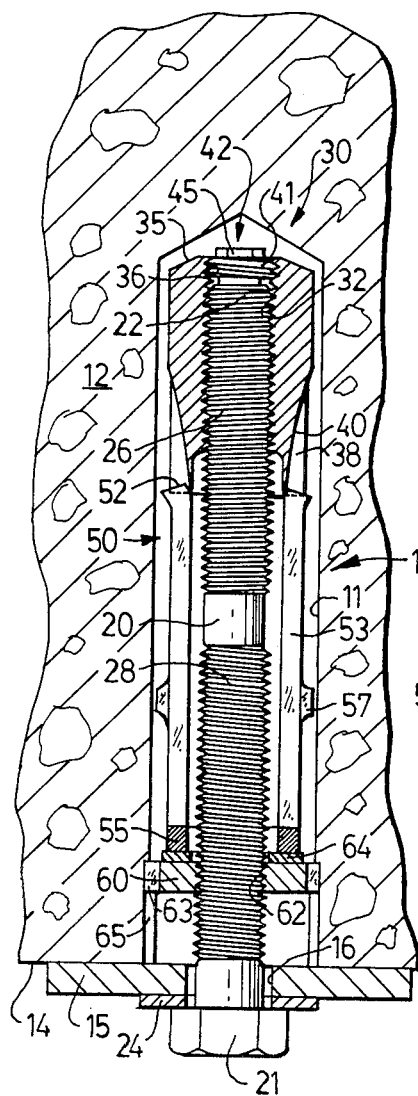
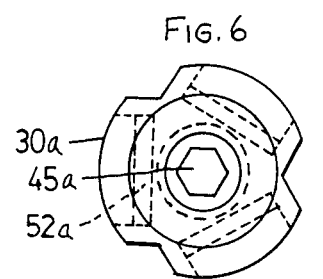
FIG. 6
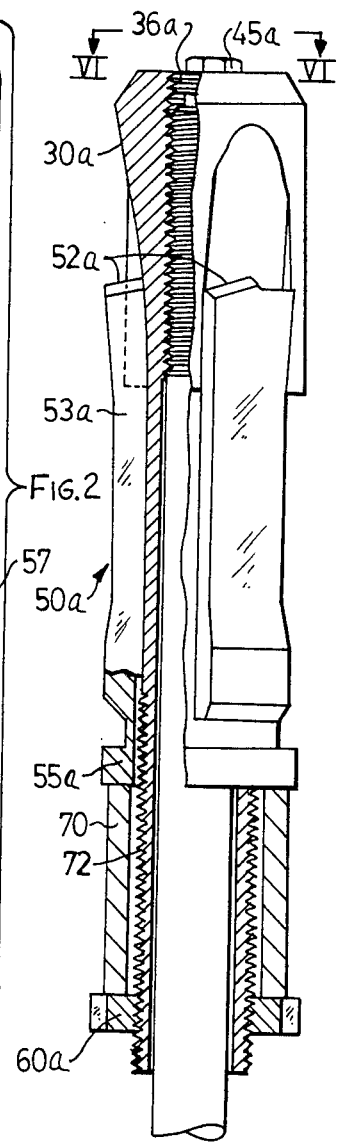
FIG. 5

Fig. 3
Fig. 4
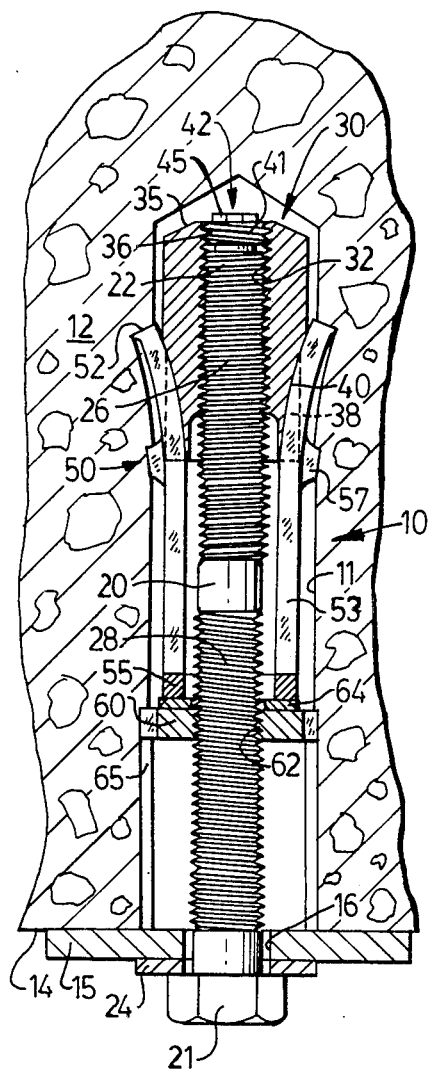
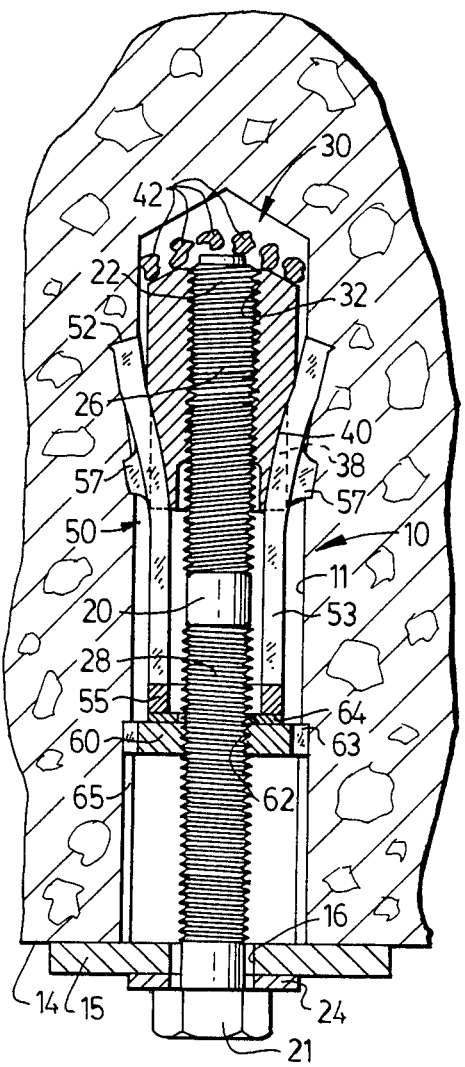

SELF-CUTTING EXPANSION ANCHOR

DESCRIPTION

1. Technical Field

The present invention generally relates to an expansion anchor of the type used in relatively solid wall materials such as stone, coal or masonry construction and more particularly to such an anchor that may be employed in the retention of ceiling supports for mine tunnels and the like.

2. Background Art

Presently, most mine ceiling support anchors are installed in a straight bore formed in the solid material of the mine tunnel ceiling. Typical anchors usually provide a plurality of expandable segments which are radially extended to compress the surrounding wall strata by the segments wedging outwardly in mechanically gripping relation within the bore. These have been somewhat successful in the softer materials which are easily penetrated by the segments but in harder materials such anchors might not exert sufficient force to obtain any appreciable penetration of the segments into the wall of the bore. Consequently, the anchor has to rely exclusively on whatever limited frictional engagement is acheived for preventing loosening and outward sliding movement of the anchor. In order to overcome these problems there has been provided an epoxy resin composition which is placed in the bore which immediately solidifies around the anchor to enhance its retention capability within the bore. This, however, requires the additional steps of placing containers having separate epoxy and resin chambers within the bore and further providimg some means on the anchor bolt for rupturing and mixing such ingredients during installation and expansion of the anchor segments. This procedure has the inherent disadvantage of not providing any assurance or other determination that the required rupturing of the container and proper mixing of the ingredients has taken place since such operation is completely hidden from view.

Other methods of securing such expansion anchors have employed a multi-step procedure first requiring the use of a special expandable cutting tool to form an undercut or ledge adjacent to the bottom of the straight bore. These special cutting tools must then be retracted and withdrawn from the bore and then a conventional expansion bolt inserted for expansion of the segments into the undercut portion of the bore. This, of course, has the advantage of providing a positive locking engagement of the anchor in such undercut and eliminates the necessity of using a hardenable epoxy glue but still requires the more tedious and complicated multi-step installation procedure. It is, therefore, recognized that it would be highly desirable to provide an improved expansion anchor which can be installed in dependable positive locking engagement without the necessity of using any additional adhesive additives, or the like, in a greatly simplified single one-step procedure. Accordingly, the present invention is intended to overcome the problems as set forth above.

3. Disclosure of the Invention

In accordance with one aspect of the present invention there is provided a self-cutting expansion anchor which utilizes a combined expandable cutter blade and wall gripping member mounted on an elongated rotatable anchor bolt which is receivable within the usual straight bore formed in a solid wall to receive such an anchor with the combined cutter and gripping member being effective to cut its own undercut within the wall of the bore and which remains extended into such undercut for permanently securing the anchor bolt within the bore.

BRIEF DESCRIPTION OF THE DRAWINGS

FIG. 1 is a partial side elevational view and transverse cross-section through the self-cutting expansion anchor of the present invention shown in an initially inserted non-expanded position.

FIG. 2 is an exploded view of the several major components of the self-cutting expansion anchor of the present invention removed from the assembly of FIG. 1.

FIG. 3 is a view similar to FIG. 1 but showing the self-cutting expansion anchor of the present invention in an intermediate expanded position within the bore.

FIG. 4 is a fragmentary view of the self-cutting expansion anchor of the present invention shown in a fully expanded positive locking position within the bore.

FIG. 5 is a combined side elevational and partial section view of a second form of self-cutting expansion anchor of the present invention.

FIG. 6 is an end elevation of the expansion anchor of FIG. 5 looking in the direction of the arrows on Line VI—VI of FIG. 5.

BEST MODE FOR CARRYING OUT THE INVENTION

Referring more particularly to FIG. 1 of the drawings, a self-cutting expansion anchor embodying the principles of the present invention is generally indicated by the reference numeral 10 and is shown inserted into an elongated straight bore 11 within a solid wall 12. The wall has an outer face 14 which may represent the ceiling of a mine tunnel or the like to which it is desired to secure an elongated ceiling support strap 15 having at least one aperture 16 therein.

The self-cutting expansion anchor 10 includes an elongated anchor bolt 20 having a hexagonal shaped headend 21 and an opposite distal end 22. A conventional washer 24 is disposed on the bolt between the head end and the ceiling support strap 15 for facilitating relative rotational movement therebetween. Adjacent to the distal end 22 of the bolt is provided a series of right-handed screw-threads 26 in somewhat spaced relation to a series of left-handed screw-threads 28 adjacent to the headend of the bolt.

A somewhat enlarged elongated generally cylindrical ramp nut 30, as further shown in FIG. 2, has an internal right-handed screw-threaded bore 32 therein for providing a right-handed screw-threadable mounting of the nut upon the distal end 22 of the bolt 20. The nut has a bolt receiving end 34 and an opposite crowned or chamfered end 35. The threaded bore 32 adjacent the distal end of the nut has a left-handed threaded section 36 consisting of two to three left-hand threads for a purpose soon hereinafter to be discussed. A pair of elongated tapered grooves 38 are disposed in the periphery of the ramp nut in diametrically opposed relation to provide a pair of radially outwardly angularly diverging camming surfaces 40.

A breakout plug 42 having left-handed screw-threads 41 thereon is screw-threadably received within the left-handed screw-threaded bore 36 of the nut and provides a hexigonal shaped head for tightening the plug within the bore of the nut. An inwardly opening hexigonal cavity 46 is provided for receiving an Allen wrench or like alternatively for installing the plug within the nut. The breakout plug is constructed of an easily fracturable plastic material and is initially installed to tightly engage the distal end 22 of the anchor bolt 20 during the initial installation procedure which will be more fully described hereinafter.

The self-cutting expansion anchor 10 of the present invention further includes a pair of combined cutting blades and wall gripping members 50 which are mounted on the expansion bolt 20 in substantially precisely axially aligned relation with the grooves 38 within the ramp nut 30. Each of the cutting blades includes inwardly disposed cutting edges 52 on an elongated shank portion 53. The shank portions of the blades are integrally formed in outwardly extended spaced substantially parallel relation from an annular blade actuating ring 55 which is disposed in loosely circumscribing relation about the anchor bolt 20. A pair of radially outwardly extended protuberances 57 are formed on the shank portions 53 of the cutting blades which serve as delayed stop members during the installation procedure.

An annular thrust nut 60 having an internally left-handed screw-threaded bore 62 therein is screw-threadably mounted on the left-handed screw-threaded portion 28 of the anchor bolt 20. A pair of diametrically opposed protuberances or stop members 63 are radially outwardly extended from the periphery of the thrust nut and a conventional washer or spacer 64 is disposed between the annular actuating ring 55 of the cutting blades and the thrust nut 60.

As best shown in FIG. 5 of the drawings, a second embodiment of the self-cutting expansion anchor of the present invention is shown with the same components common to the first form of the preceding Figs. being provided with the same reference numerals but with the addition of the suffix "a". While generally similar and nearly identical in operation, such second form distinguishes from the preceding form by providing a ramp nut 30a which adds an additional groove 38a to accommodate an additional combined cutting blade and wall gripping member 50a in wall installations where additional gripping force might be desired. The second form further distinguishes over the first by including an elongated cylindrical skirt portion 70 axially extended from the bolt receiving end 34a of the ramp nut 30a on which is formed a plurality of left-hand threads 72. In this form a somewhat larger diameter thrust nut 60a is employed for screw-threadable mounting on the skirt 70a in loosely circumscribing relation about a further modified anchor bolt 20a which does not have the left-handed screw-threads 28 of the first form since these are now provided in the second form by the threads 72 on the skirt 70. Accordingly, a more conventionally constructed anchor bolt 20a can be employed with this second form of the invention by having a smooth body portion adjacent to the headend 21a thereof and the conventional right-handed screw-threads 26a adjacent to the distal end 22a thereof.

INDUSTRIAL APPLICABILITY

In operation, the several described components of the self-cutting expansion anchor 10 are assembled in the pre-expansion condition of FIG. 1 after first extending the anchor bolt 20 through the hole 16 in the mine ceiling support strap 15. The thus assembled expansion anchor is then easily inserted into the straight bore 11 within the solid wall 12 with the only interference being the stop members 63 on the thrust nut 60. During such initial insertion procedure, the stop members are effective to gouge an elongated furrow 65 within the walls of the bore to ensure against any rotation of the thrust nut 60. Accordingly, upon rotation of the anchor bolt 20 by a suitable wrench installed on the headend 21 thereof, not shown, in the usual clockwise direction of rotation the left-hand threads 28 will cause the thrust nut to be axially moved further inwardly of the bore toward the distal end 22 of the anchor bolt. During such movement the actuating ring 55 moves the combined cutting blades and wall gripping member 50 into axially sliding relation with the camming surfaces 40 of the grooves 38. It will be apparent that during such rotation of the anchor bolt that the cutting blades 50 and the ramp nut 30 will all rotate as a unit. Also during such axial sliding movement of the cutting blades they will be cammed radially outwardly of the wall of the bore to progressively enlarge the bore to an inverted frustoconical configuration upon reaching their fully expanded position of FIG. 3.

Simultaneously with the blades 50 reaching their fully expanded position of FIG. 3 the stop members 57 on the shank portions 53 of the blades will gouge into the walls of the bore 11 which will cause the blades to stop rotating and through their connection with the grooves 38 to also stop rotation of the ramp nut 30. When this occurs further rotation of the head end 21 of the bolt 20 will cause a greater force to be exerted by the distal end thereof against the breakout plug 42. When such force is great enough the breakout plug 42 will disintegrate as shown in FIG. 4 permitting the anchor bolt to axially advance completely through the ramp nut 30. This causes the ramp nut to be drawn toward the head end of the anchor bolt which in turn further expands the combined cutting blades and wall gripping members 50 into a positively set permanently gripping further expanded somewhat deformed position within the conical undercut formed adjacent to the bottom of the bore 11. It will readily apparent that the second form of the present invention as shown in FIGS. 5 and 6 will operate in exactly the same way to achieve the same result as that described above for the first embodiment.

In view of the foregoing it is readily apparent that the structure of the present invention provides an improved self-cutting expansion anchor which can be simply installed in a single operation which is effective to cut its own enlarged inverted generally conical undercut within the straight bore which then utilizes the same cutting blades as further expandable wall gripping members to permanently lock the anchor bolt within the bore without the need of any additional adhesive additives or other procedural steps. This is all accomplished by initially inserting the anchor bolt into the bore and by rotating the anchor bolt in the usual right-hand direction to install the anchor in one continuous motion.

I claim:

1. A self-cutting expansion anchor, for solid wall installation, comprising;
   an elongated rotatable anchor mounting assembly having separable bolt and ramp portions;
   radially expandable cutter and wall gripping means axially slideably mounted on said ramp portion of said mounting assembly;

thrust means on said assembly axially engaging said cutter and wall gripping means;

and a pair of axially spaced opposite-hand screw-threaded portions on said assembly individually screw-threadably mounting said ramp portion on said bolt portion of the assembly, and said thrust means on said assembly in axially spaced relation to said ramp portion.

2. A self-cutting expansion anchor, for solid wall installation, comprising;

an elongated anchor bolt having an outer head end and an opposite inner screw-threaded distal end, and an intermediate screw-threaded portion;

ramp means screw-threadably mounted on said distal end of said bolt and providing at least one camming surface angularly outwardly extended from the bolt;

non-rotatable thrust means including a nut having gripping means thereon screw-threadably mounted on said intermediate portion of the bolt in longitudinally spaced relation to said ramp means;

expandable cutter means axially slideably mounted on said bolt in sliding engagement with and extending between said ramp means and said thrust means and having at least one cutting blade slideably engaging said camming surface of said ramp means, said blade including an integral activating ring circumscribing said bolt and axially engaging said nut of said thrust means with the blade having sufficient flexibility to progressively flex radially outwardly of the bolt during traversement along said camming surface;

said bolt having right-hand threads on its inner distal end;

said ramp means is an internally screw-threaded ramp nut screw-threadably mounted on said inner distal end of the bolt;

and said intermediate portion of said bolt has left-handed screw-threads on which said thrust nut is screw-threadably mounted.

3. The self-cutting expandable anchor of claim 2 including anti-rotational stop means on said cutting blade adjacent to said actuating ring causing relative rotation between said ramp nut and said bolt to draw said ramp nut toward said head end of the bolt further radially expanding the blade to a fully locked position.

4. The self-cutting expandable anchor of claim 3 including a breakout plug screw-threadably mounted in said ramp nut initially resisting said relative rotation between said ramp nut and said bolt but constructed of a sufficiently fragile material capable of fracturing by an increased force imposed by said stop means on the blade.

5. A self-cutting expandable anchor comprising;

an elongated bolt having a head end, an intermediate portion provided with left-hand screw-threads thereon, and an opposite distal end provided with right-hand screw-threads thereon;

an internally screw-threaded ramp nut screw-threadably mounted on said distal end of said bolt and having a left-handed screw-threaded portion;

a left-handed screw-threaded fracturable plug screw-threadably mounted in said left-handed screw-thread portion of the ramp nut in temporary locking engagement with said distal end of the bolt;

said ramp nut including a plurality of elongated longitudinally extended grooves formed therein in circumferentially spaced relation to each other individually providing angularly radially outwardly diverging camming ramp surfaces;

a plurality of elongated flexible combined cutting blades and expandable gripping members disposed in circumferentially spaced relation to each other and having an integral annular actuating ring loosely journalled on said intermediate portion of the bolt interconnecting said blades in individually axially sliding engagement with said camming surfaces on the ramp nut, each of said blades including a stop member thereon adjacent to said actuating ring;

and an internally threaded thrust nut screw-threadably mounted on said intermediate left-handed screw-threaded portion of said bolt in axially facing engagement with said actuating ring of the blades and having a pair of opposed anti-rotation stop members peripherally extended therefrom permitting axial advancement of the thrust nut toward said ramp nut during rotation of the bolt.

6. A self-cutting expandable anchor comprising;

an elongated bolt having a head end and an opposite distal end provided with right-hand screw-threads thereon;

an internally screw-threaded ramp nut screw-threadably mounted on said distal end of said bolt and having a left-handed screw-thread portion;

a left-handed screw-threaded fracturable plug screw-threadably mounted in said left-handed screw-thread portion of the ramp nut in temporary locking engagement with said distal end of the bolt;

said ramp nut including a plurality of elongated longitudinally extended grooves formed therein in circumferentially spaced relation to each other individually providing angularly radially outwardly diverging camming ramp surfaces, and an elongated cylindrical skirt axially extended from the ramp nut and having left-handed screw-threads thereon;

a plurality of elongated flexible combined cutting blades and expandable gripping members disposed in circumferentially spaced relation to each other and having an integral annular actuating ring loosely journalled on said skirt interconnecting said blades in individually axially sliding engagement with said camming surfaces on the ramp nut, each of said blades including a stop member thereon adjacent to said actuating ring;

and an internally threaded nut screw-threadably mounted on said left-handed screw-threaded skirt of said ramp nut in axially facing engagement with said actuating ring of the blades and having a pair of opposed anti-rotation stop members peripherally extended therefrom permitting axial advancement of the thrust nut toward said ramp nut during rotation of the bolt.

* * * * *